United States Statutory Invention Registration [19]

[11] Reg. Number: H263

Piscitella [43] Published: May 5, 1987

[54] WOVEN HEAT EXCHANGER

[75] Inventor: Roger R. Piscitella, Idaho Falls, Id.

[73] Assignee: The United States of America as represented by the United States Department of Energy, Washington, D.C.

[21] Appl. No.: 631,265

[22] Filed: Jul. 16, 1984

[51] Int. Cl.[4] ..... F28F 1/10

[52] U.S. Cl. ..... 165/172; 165/158; 65/4.21

[58] Field of Search ..... 165/158, 172; 65/4.21

[56] References Cited

U.S. PATENT DOCUMENTS

| | | | |
|---|---|---|---|
| 2,977,265 | 3/1961 | Forsberg et al. | 165/DIG. 8 X |
| 3,153,279 | 10/1964 | Chessin | 165/DIG. 8 X |
| 4,085,588 | 4/1978 | Reams et al. | 165/166 X |
| 4,157,929 | 6/1979 | Kubicek | 165/DIG. 8 X |
| 4,183,213 | 1/1980 | Rao | 165/158 X |
| 4,360,057 | 11/1982 | Koump | 165/158 X |
| 4,386,456 | 6/1983 | Volz | 165/162 |
| 4,428,763 | 1/1984 | Layden | 65/4.21 |
| 4,545,429 | 10/1985 | Place, Jr. et al. | 126/442 |

OTHER PUBLICATIONS

Lexpat Search, 11/16/84.

*Primary Examiner*—Donald P. Walsh
*Attorney, Agent, or Firm*—Walter L. Rees; Paul A. Gottlieb; Judson R. Hightower

[57] ABSTRACT

In a woven ceramic heat exchanger using the basic tube-in-shell design, each heat exchanger consisting of tube sheets and tube, is woven separately. Individual heat exchangers are assembled in cross-flow configuration. Each heat exchanger is woven from high temperature ceramic fiber, the warp is continuous from tube to tube sheet providing a smooth transition and unitized construction.

13 Claims, 5 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

WOVEN HEAT EXCHANGER

CONTRACTUAL ORIGIN OF THE INVENTION

The United States Government has rights in this invention pursuant to Contract No. DE-AC07-7-6ID01570 between the U.S. Department of Energy and EG&G Idaho, Inc.

BACKGROUND OF THE INVENTION

This invention relates generally to a heat exchanger for waste heat recovery from high temperature industrial exhaust streams.

The Environmental Protection Agency (EPA) estimated that 23% of the major or energy intensive industrial fuels and electricity energy consumption is discharged as waste heat in flue gases. Industry has attempted to decrease the amount of this lost energy with waste heat recovery systems (recuperators or regenerators). However, because of the high temperatures and corrosive constituents in the waste heat streams, lack of durability of the construction materials has limited recovery. Recovery of waste heat from high-temperature industrial gas streams is most commonly done by preheating combustion air using either a recuperator or a regenerator. Generally, a a recuperator uses the exhaust gas to heat the combustion air directly or through a partition wall. A regenerator normally allows hot exhaust gas and combustion air to move alternately through the same passage, thus indirectly heating the combustion air. Historically, recuperators and waste heat boilers have been constructed of metal. However, these conventional metallic heat exchangers cannot survive for extended periods in high-temperature, dirty environments without incurring severe performance penalities. Failure of the system affects not only its ability to recover waste heat, but also the operation of the process to which it is attached. Corrosion has debilitating effects on most all metals, causing premature failures and/or excessive leakages. Fouling decreases heat transfer rate, increases pressure drop, and adds expense due to increased surface area and the necessity for cleaning and refurbishing.

Ceramics, an alternative to metals, allow significantly higher material temperatures and offer resistance to many corrosive constituents in industrial waste streams. However, certain technical limitations exist which severely restrict the application of advanced ceramic heat exchangers in high temperature fouling and corrosive waste streams. These include the high costs for ceramic fabrication, problems with satisfactorily joining ceramics, the lack of data and accurate methods to predict thermal-structural behavior of ceramics especially as affected by long-term exposure to corrosive environments, the sensitivity of some of the more corrosive-resistant ceramics to thermal shock fracture, and the inability to detect and evaluate flaws causing failure.

Some major waste heat streams include glass melting, aluminum remelt, and steel soaking and reheat furnace flue gases. Although many other sources of waste heat exist, these three represent the largest quantity of waste heat. The streams are very high temperature, generally 1500° to 2800° F. and usually contain highly corrosive constituents which degrade the materials and contain particulates that tend to build up and foul the heat exchanger.

Therefore it is an object of the present invention to provide a ceramic heat exchanger suitable for use in waste heat streams.

It is another object of the present invention to provide a heat exchanger suitable for use at high temperatures and resistant to corrosion and fouling.

Additional objects, advantages, and novel features of the invention will be set forth in part in the description which follows, and in part will become apparent to those skilled in the art upon examination of the following or may be learned by practice of the invention.

SUMMARY OF THE INVENTION

To achieve the foregoing and other objects and in accordance with the purposes of the present invention, a tube-in-shell heat exchanger may comprise a first tube sheet; a second tube sheet; and a tube extending from the first tube sheet to the second tube sheet, the tube sheets and tube being formed of woven ceramic fibers. Preferably, the ceramic warp fibers extend from each tube sheet to the tube forming a continuous transition from the first tube sheet to the tube and from the second tube sheet to the tube. The tube sheet being woven with the same fibers that form the tube warp allows a smooth load carrying transition from tube to tube sheet with a resulting low pressure drop. This also permits the tube sheet to have the same thickness as the tube itself, minimizing any thermally induced stresses from discontinuities in the transition area. The thin tube sheet will also be an effective heat transfer surface.

BRIEF DESCRIPTION OF THE DRAWINGS

The present invention is illustrated in the accompanying drawings wherein.

DETAILED DESCRIPTION OF THE INVENTION

Figure 1:
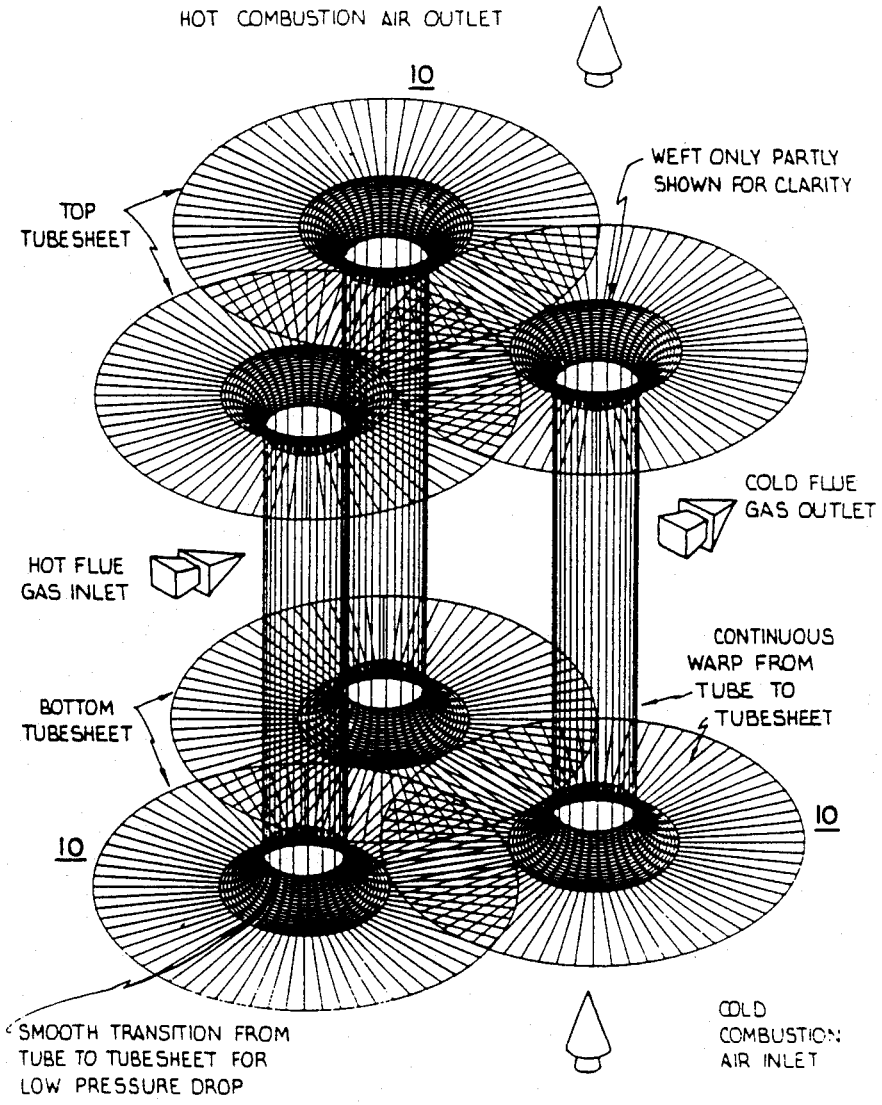
FIG. 1 is an isometric of three woven tube-in-shell heat exchangers, each having a single tube.
Figure 2:
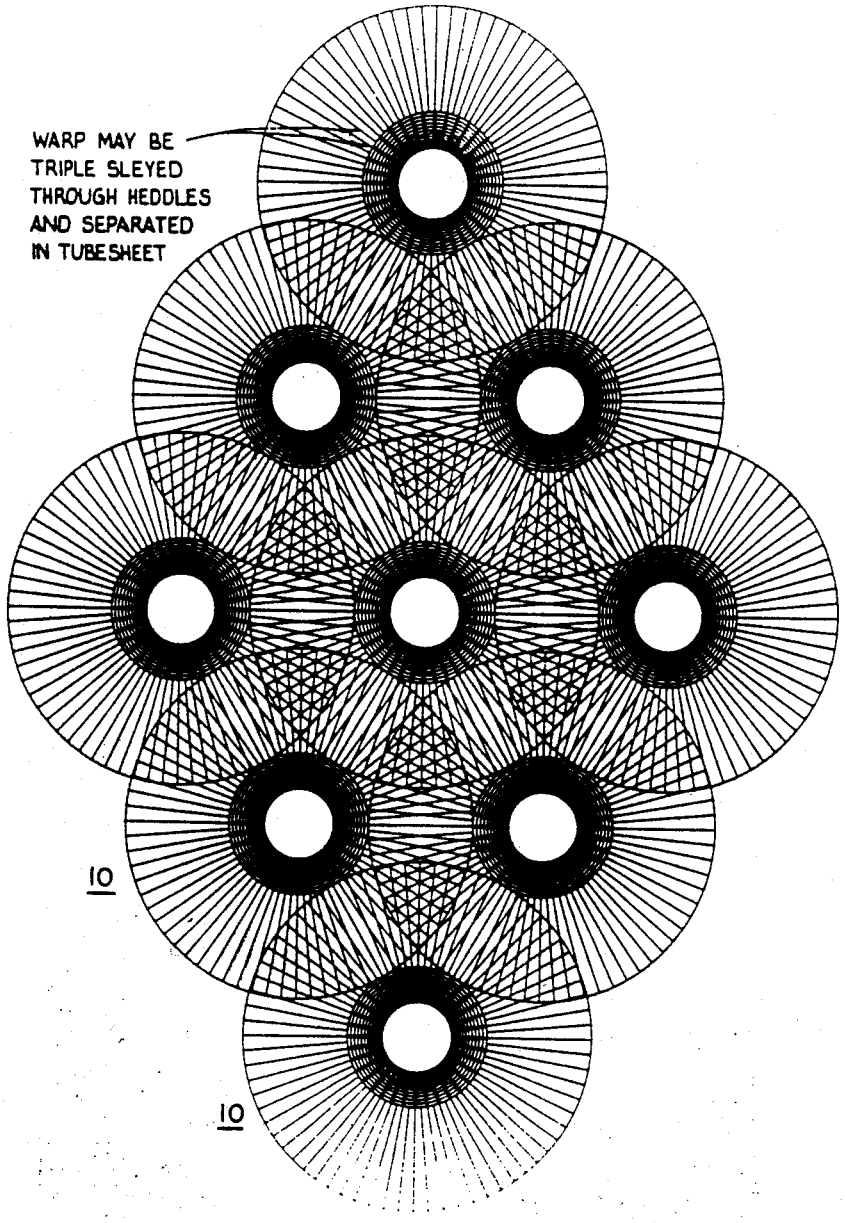
FIG. 2 is a top view of the weaving pattern on the tube sheet for nine tube-in-shell heat exchangers assembled together.

The woven tube ceramic heat exchanger is a basic tube-in-shell design, differing from the traditional design in the materials fabrication methods used, and the configuration of tubes and tube sheets. Referring to FIG. 1 three tube-in-shell heat exchangers 10 are shown. In this embodiment, each heat exchanger is woven separately and then the individual heat exchangers are assembled in a cross-flow configuration. Each heat exchanger is woven from high temperature ceramic fiber into a one piece tension structure composed of a tube and tube sheets. The warp is continuous from tube to tube sheet providing a smooth transition. The weft is partly shown for clarity and extends continuously from tube to tube sheet surface. Alternatively, more than one tube could be woven into the tube sheets. In FIG. 2 there are shown nine heat exchangers 10 from a top view as they would be assembled together to form a larger heat exchanger.

Figure 3:
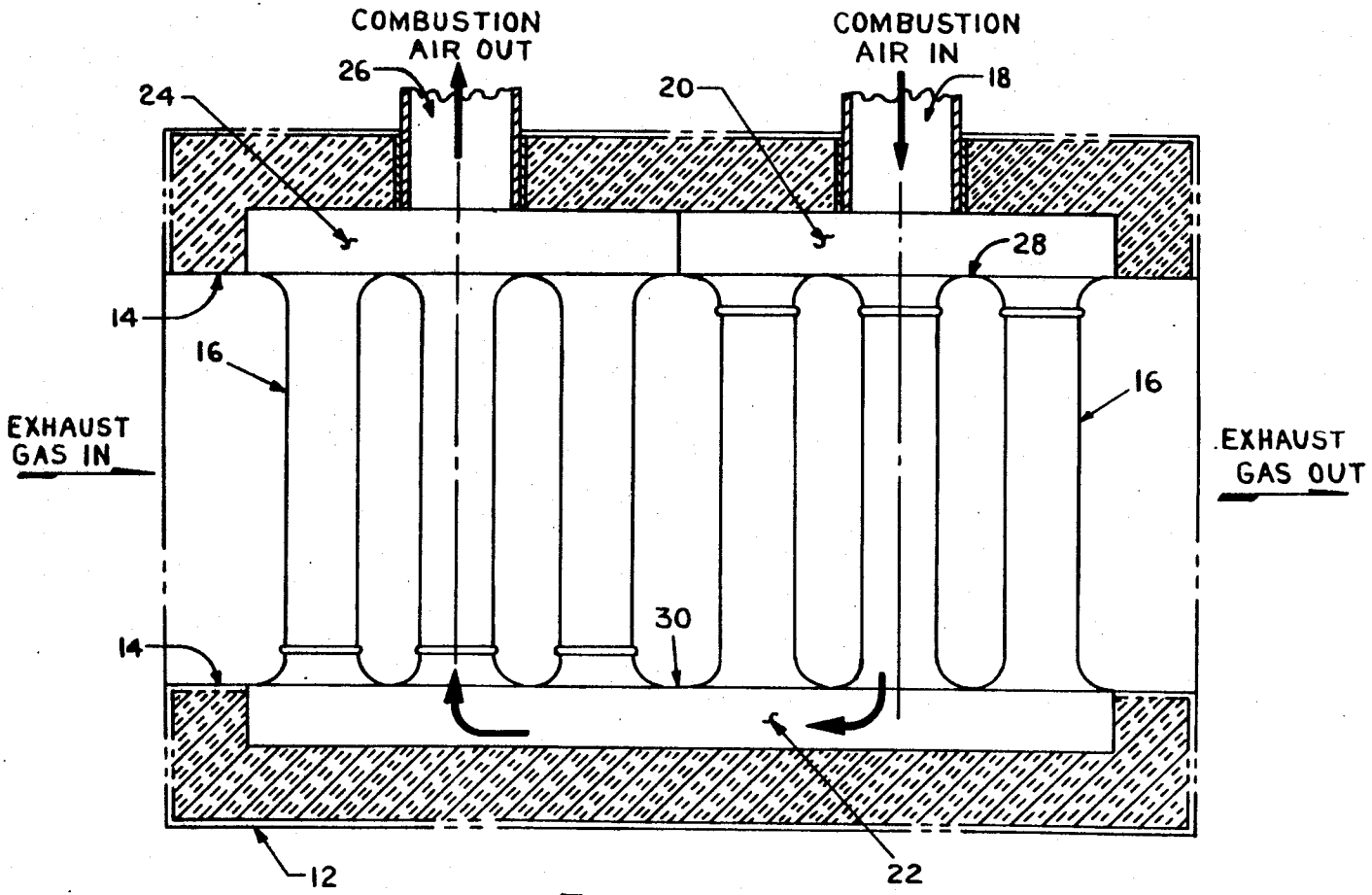
FIG. 3 is a cross section of an operative heat exchanger.

Referring to FIG. 3, there is shown one embodiment of a complete operative cross flow heat exchanger incorporating the particular tubes which are the subject this disclosure. The components are contained within a recupurator shell 12 within which is provided a central passageway 14 into which exhaust gas enters and out of which exhaust exits after passing between individual tubes 16. The tubes are formed as otherwise herein disclosed. Combustion air enters the assembly at inlet port 18 and passes through half the pipes via inlet plenum 20. Combustion air then flows through the other half of the tubes 16 via combustion air plenum 22 as indicated by the arrows and leaves the exchanger via outlet plenum 24 and output port 26. Each tube 16 is connected in a matrix to top tube sheet 28 and bottom tube sheet 30 as shown for example in FIG. 2.

Weaving is already an automated, well-established industry and only relatively minor changes, if any, are needed to handle ceramic fiber, mainly related to fiber flexibility. The computer and computer-controlled looms make possible a great variety of design variations. Tubes can be made in many shapes or configurations determined to be effective for a specific waste stream. Tubes can be arranged as desired for fouling and corrosion resistance, ease of cleaning and inspection, and stress field optimization or redirection. Heat exchanger design for each application can be easily optimized with the aid of the computer controlled loom if a detailed analysis model is developed.

An alternate construction method may be used in cases where heat exchangers are "built up" from three parts: a flat woven tube sheet with holes woven or cut, a woven/braided tube, and a transition piece to connect the two. Rather than weave the heat exchanger as a unit, modules of the heat exchanger may be woven and then joined together.

The one-piece (unitized) construction has the potential to eliminate leaks between tubes and tube sheets, and the uniform material thickness (preferably 0.060 in thick or less) has the potential to eliminate thermal gradient stress caused by material thickness changes. The radiused transition from tube to tube sheet as seen in FIG. 1 permits the smooth transfer of loads, from pressure or thermal expansion, without stress concentration such that stress fields are more constant and change more gradually when they do change. If some fibers have flaws or are overstressed and break, others carry the load and the recuperator does not completely fail, as would a unit made of monolithic ceramic material. Another advantage of the woven heat exchanger is that the thin and relatively lightweight fabric uses only the required amount of material which helps to minimize costs.

Some commercially available ceramic fibers include silicon carbide (available as Nicalon® SiC continuous fiber—500 filament), alumina (available as Fiber FP® yarn—200 filament/yarn) and zirconium oxide (stabilized). (Nicalon is a Nippon Carbon Co., Trademark and FP is a DuPont Trademark.)

Figure 4:
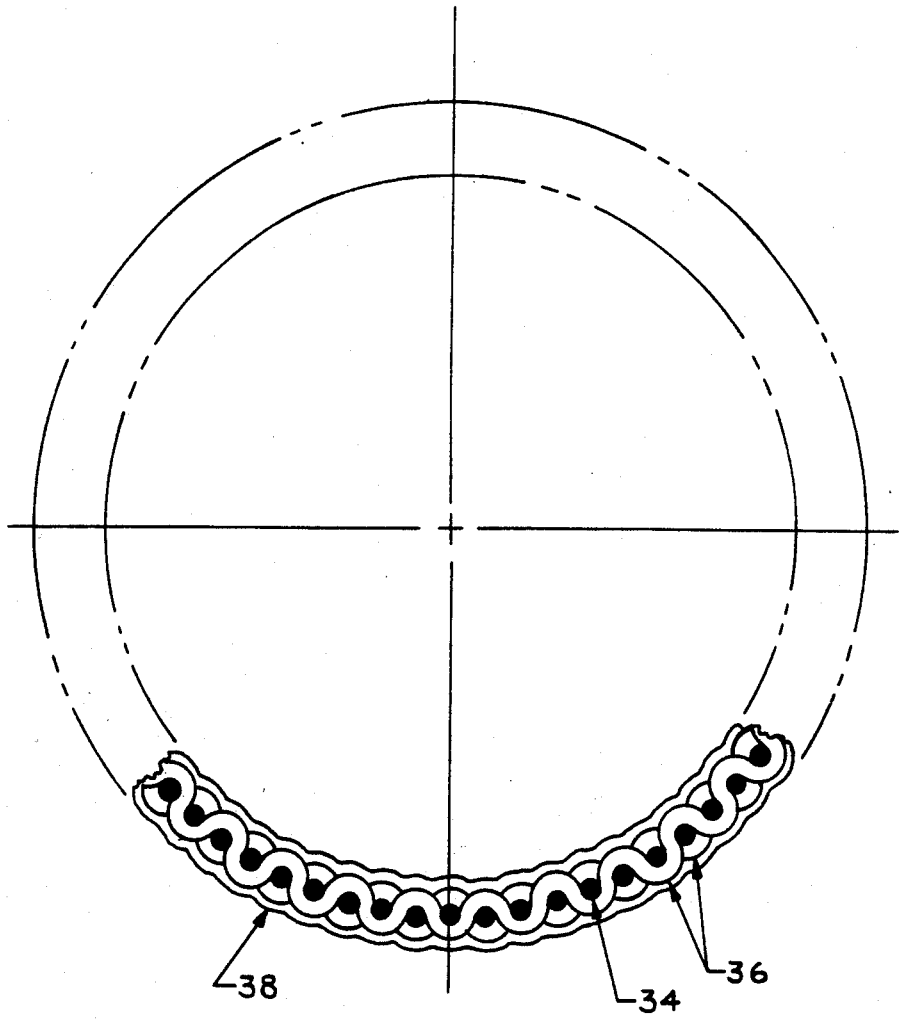
FIG. 4 is a view showing one means of weaving a heat exchanger tube.

Since ceramics display excellent compressive strength and fibers have excellent tensile strength, the woven tube-in-shell heat exchanger can be built to withstand greater compressive stresses by embedding the heat exchanger in a matrix, as shown in FIG. 4, or the individual strands can be coated with a ceramic material after weaving. In FIG. 4, the warp strands 34 are woven with the weft strands 36 and are contained within matrix 38.

If a ceramic fiber/matrix is susceptible to corrosion by a particular gas stream constituent, the matrix can be coated with a resistant material or another compound can be added to to the matrix. In this way, a matrix or coating can be compounded to exhibit specific properties, or stratified for special chemical resistances. Some suitable matrix materials include zirconia and stabilized zirconia types.

The woven heat exchanger lends itself to the techniques of NDE and acoustic emission, especially since the diameter of all ceramic fibers in a heat exchanger need not be the same. If tracer strands, sized to break well before the main fibers, are included in the weave, acoustic transducers can be used to detect for fractured fibers and identify set point stress levels and their location. This information can be used to predict maximum safe stress versus operating condition variables, stress field concentrations, and to indicate impending failure. This technique can also be used to indicate when fatigue limits are imminent and replacement is required.

Figure 5:
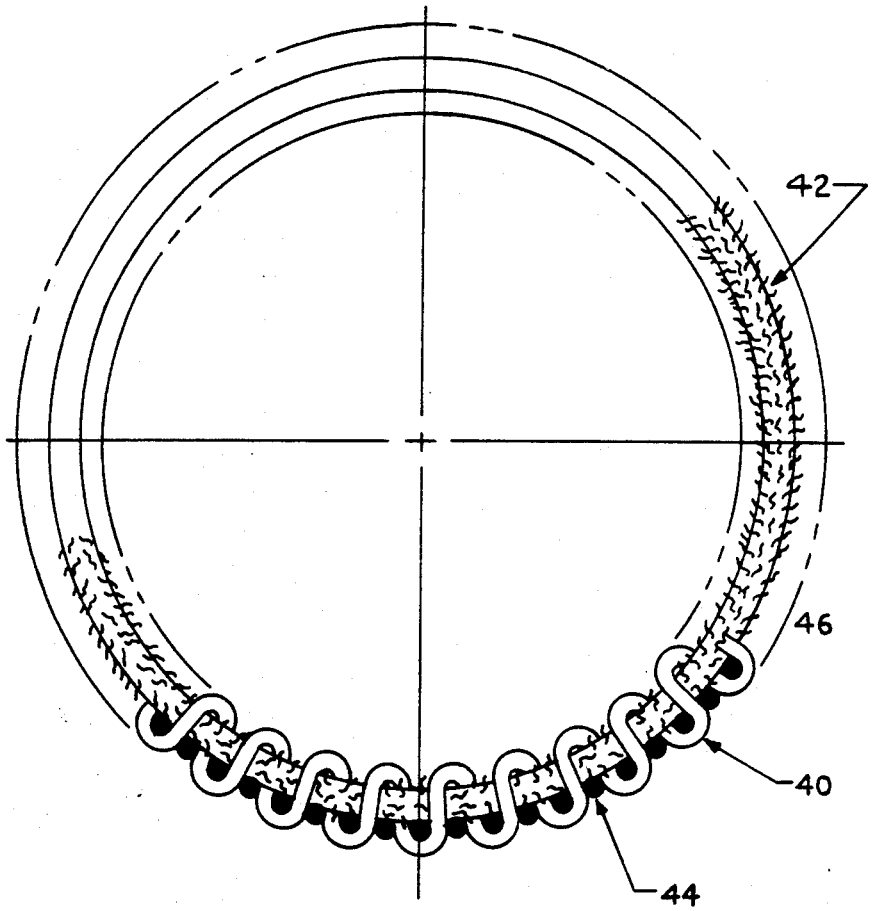
FIG. 5 is a view showing another means of weaving a heat exchanger tube.

Varying fiber diameters instead of fiber materials is also useful for heat transfer. The ratio of surface roughness to hydraulic diameter for a specific operating condition can be varied to yield the desired heat transfer coefficient and pressure drop. Braiding or weaving a large diameter fiber spirally into a tube will act as a turbulator. Adding or making fins integral to the tube structure is possible, but adds complexity and cost. Weaving wooly yarn strands to act as pin fins is much simpler. As shown in FIG. 5 the weft strand 40 can be coiled above wooly fibers 42 with the warp strands 44 interspersed with weft strand 40. On the gas side of the heat exchanger, the wooly fibers induce turbulence in addition to acting as pin fins. Properly positioned wooly fibers delay boundary layer separation and may damp vortex shedding oscillations.

In long tubes, weft threads take the hoop stress and could have a smaller cross section than warp threads, which run longitudinally. Warp threads bear tube weight and transfer loads to the tube sheet. At the transition area between tubes and tube sheet, weft threads could be increased in size to stiffen the transition area from tube to tube sheet. With the unitized tube design, computer-controlled looms can make almost any smooth transition geometry.

Chemical attack by gas stream constituents can be minimized by coating the fibers with an impervious material such as high viscosity glasses, alumina, and mullite. Embedding the ceramic fibers in a rigid matrix decreases buckling of the unsupported fibers and also prevents environmental attack.

No matter how tightly a fiber is woven, some gaps between fibers will occur resulting in leakage. However, leakage can be effectively eliminated by the choice of material for the ceramic fibers.

For example, SiC forms an oxide coating on its outer layer at high temperatures, and zirconia fibers sinter to each other above 2500° F. These coating/binding mechanisms seal the pores between fibers eliminating leakage. Leakage can also be eliminated with a viscous glass in the gaps, or a matrix encapsulating the fibers. A viscous glass coating has the additional benefit of dampening oscillations, and a rigid matrix also stiffens the structure.

The woven tube-in-shell design has several inherent advantages to limit fouling. These advantages include the relatively large passages that do not readily plug and flexibility of design which allows for smooth contours to minimize dead regions where fouling occurs.

EXAMPLE DESIGN CALCULATION FOR A WOVEN HEAT EXCHANGER

The following analysis was completed to size a ceramic woven heat exchanger to be used as a recuperator in a typical steel soaking pit. The stream conditions and performance parameters for this application are given in Table 1. Table 2 summarizes the calculated geometry and performance. A summary of the analysis method is given below.

Analysis of the woven tube designs is predicated on the following assumptions: the tube to tubesheet transition is well-rounded resulting in entrance and exit flow coefficients of 0.04 and 1.0 respectively (Crane: Flow of Fluids p. A-29); there is heat transfer across the tubesheets; rectangular ducts are used with round tubes axially oriented along the height dimension (i.e., running top to bottom not side to side) the loss coefficient due to turning (for multiple pass units) is $\approx 3.6$ for each turn (Idel'Chik: Handbook of Hydraulic Resistance, diag. 6-21) based on rectangular turning ducts of 1.0 aspect ratio and a between pass length of zero; and a staggered tube arrangement.

Analysis was performed on a HP-41C calculator using a program specifically developed using the above assumptions. Initially, geometry parameters, air and gas stream conditions, and air/gas/material properties, and the maximum allowed gas $\Delta P$ are input. After calculating the number of tubes in the first row and other assorted flow variables, the maximum number of total tube rows is calculated based on gas $\Delta P$ max (Kreith: Principles of Heat Transfer, eq. 9-11 and 9-12). The user then chooses the number of air side passes and the total number of tube rows which does not exceed the maximum number. The only restriction is that an integer value will result when dividing the total number of rows by the number of passes. The gas side $\Delta P$ is then calculated based on the total number of rows. If the gas side Reynolds number is below 1000, the user is referred to FIG. 9.18 (Kreith: Principles of Heat Transfer) for the gas side friction factor. The air side $\Delta P$ is then calculated by manipulation of Darcy's formula for heat loss. Air side friction factors are calculated by one of four single phase correlations from the TRAC computer code. The applicable correlation is chosen based on Reynolds number and relative roughness, $\epsilon/D$. Absolute roughness, $\epsilon$, can be input by the user or for ceramic coated woven fabric defaults to 0.001 inch. $fL/D$ or $K_{pipe}$ is added to the other loss coefficients —$K_{ent}$, $K_{exit}$, and $K_{turn}$ (as specified by the geometry) and then $K_{total}$ is input to the manipulated Darcy formula to get air side pressure drop. At this point, the user can modify the geometry and start the analysis over if the pressure drops are not satisfactory or continue if they are.

Continuing, the gas and air heat exchange areas are calculated. If the gas Reynolds number is less than 1000 the user must look up the Colburn-j factor from FIG. 9-18 (Kreith: Principles of Heat Transfer), whereupon the gas film coefficient is backed out. For Reynolds number greater than 1000, equation 9-10 (Kreith: Principles of Heat Transfer) is used to get the gas film coefficient. Next, the tube length is calculated assuming a shape factor of 1.0 and gas emissivity and absorptivity must be input. Since radiation varies as the 4th power of the temperature, a 4th power average is used for average gas temperature in the standard radiation equations 5-66 and 5-67 (Kreith: Principles of Heat Transfer). Unit gas thermal resistance is then the inverse sum of the gas film, fouling factor, and radiation coefficients. Unit thermal conductive resistance is the material thermal conductivity divided by the conduction path length. For air side, Reynolds numbers less than 2100, equation 8-28 (Kreith: Principles of Heat Transfer) is used to find the air film coefficients. For Reynolds numbers greater than 2100, equation 8-21 (Kreith: Principles of Heat Transfer) is used. The air side unit thermal resistance based on gas side area is the inverse of the air side film coefficient times the air side/gas side Hx area ratio. The three resistances are added together. The inverse of this sum is the overall unit conductance based on gas side Hx area, U. When multiplied by the gas side Hx area, the output is $UA_{calc}$. If the answer is satisfactory, the material volume of the Hx can be calculated. Otherwise, some or all of the geometry variables can be changed and the calculation rerun.

In this example the materials volume is significantly less than for a conventional ceramics design, resulting in significant cost savings for materials.

TABLE 1

Stream Conditions and Performance Parameters for a Typical Steel Soaking Pit (with 2% Excess Air)

| STREAM CONDITIONS & PROPERTIES | | DESIGN | MAXIMUM |
|---|---|---|---|
| AIR $\dot{m}$ | LBM/HR | 8654 | 13422 |
| GAS $\dot{m}$ | LBM/HR | 9114 | 14130 |
| AIR T in | °F. | 100 | 100 |
| GAS T in | °F. | 2450 | 1700 |
| AIR T out | °F. | 2000 | 1420 |
| GAS T out | °F. | 906 | 612 |
| AIR $\rho$ bulk | LBM/FT$^3$ | .0264 | .0325 |
| GAS $\rho$ bulk | LBM/FT$^3$ | .0187 | .0249 |
| AIR $\mu$ bulk | LBM/FT-SEC | $2.5230 \times 10^{-5}$ | $2.22060 \times 10^{-5}$ |
| GAS $\mu$ bulk | LBM/FT-SEC | $3.1600 \times 10^{-5}$ | $2.6353 \times 10^{-5}$ |
| AIR k bulk | BTU/HR-FT-°F. | .0327 | .0279 |
| GAS k bulk | BTU/HR-FT-°F. | .0425 | .0344 |
| MATL k | BTU/HR-FT-°F. | 10 | 10 |
| AIR Cp bulk | BTU/LBM-°F. | .2694 | .2600 |
| GAS Cp bulk | BTU/LBM-°F. | .3147 | .2996 |
| PERFORMANCE PARAMETERS | | | |
| EFFECTIVENESS, | | .809 | .825 |
| # OF AIR SIDE PASSES $\epsilon$ | | 3 | |
| # OF TRANSFER UNITS, $N_\omega$ | | ~5.2 | ~5.7 |
| MINIMUM UA required | BTU/HR-°F. | 12123 | 19891 |
| MAXIMUM GAS $\Delta P$ | INCHES W.C. | 8.0 | |

TABLE 1-continued

| Stream Conditions and Performance Parameters for a Typical Steel Soaking Pit (with 2% Excess Air) | | | |
|---|---|---|---|
| STREAM CONDITIONS & PROPERTIES | | DESIGN | MAXIMUM |
| MAXIMUM AIR ΔP | INCHES W.C. | 30.0 | |

TABLE 2

| Geometry and Performance for Ceramic (Sic) Heat Exchanger in a Typical Steel Soaking Pit | | | |
|---|---|---|---|
| DESIGN REQUIREMENTS | | DESIGN | MAXIMUM |
| MAXIMUM GAS ΔP | INCHES W.C. | 8.0 | |
| MAXIMUM AIR ΔP | INCHES W.C. | 30.0 | |
| MINIMUM UA required | BTU/HR-°F. | 12123 | 19891 |
| FOULING FACTOR | | 0.0 | |
| WOVEN TUBE HX DESIGN: GEOMETRY & PERFORMANCE | | | |
| DUCT HEIGHT × WIDTH | INCH × INCH | 48 × 22 | |
| TUBESHEET LENGTH/PASS | INCH | 65.88 | |
| TUBE O.D. × WALL | INCH × INCH | .450 × .080 | |
| STAGGERED TUBE PITCH | INCH | 1.10 | |
| # OF TUBES/PASS | | 1380 | |
| GAS SIDE Hx AREA | $FT^2$ | 2008.27 | |
| MATERIAL VOLUME | $FT^3$ | 6.0105 | |
| GAS ΔP calc | INCHES W.C. | 4.38 | 7.18 |
| AIR ΔP calc | INCHES W.C. | 17.18 | 30.07 |
| U calc (on gas side area) | BTU/HR-$FT^2$-°F. | 7.83 | 9.93 |
| UA calc | BTU/HR-°F. | 15733 | 19929 |

The embodiments of this invention in which an exclusive property or privilege is claimed are defined as follows:

1. A tube-in-shell heat exchanger comprising:
a first tube sheet,
a second tube sheet, and
a tube extending from the first tube sheet to the second tube sheet, the tube sheets and the tube being formed of woven ceramic fibers,
said woven tube having longitudinally oriented warp fibers extending from each tube sheet to the tube forming a continuous transition from the first tube sheet to the tube and from the second tube sheet to the tube.

2. The heat exchanger of claim 1 wherein the ceramic fibers are coated with a ceramic matrix material after weaving.

3. The heat exchanger of claim 2 wherein the matrix is formed of a viscous glass.

4. The heat exchanger of claim 1 wherein the ceramic fibers are formed of a material selected from the group consisting of silicon carbide, alumina, and zirconium oxide.

5. The heat exchanger of claim 1 wherein the thickness of the tube wall and the tube sheets is 0.060 in or less.

6. The heat exchanger of claim 1 further comprising metal warp fibers interspersed among and fused to the ceramic warp fibers.

7. The heat exchanger of claim 1 further comprising one or more wooly fibers woven into the tube to induce turbulence.

8. The heat exchanger of claim 1 comprising a plurality of hollow tubes extending from the first tube sheet to the second tube sheet.

9. The heat exchanger of claim 1 wherein a large diameter fiber is spirally woven into the tube wall to act as a turbulator.

10. The heat exchanger of claim 1 further comprising a transition piece for connecting each tube sheet to the tube, the tube, tube sheets, and transition pieces being individually woven.

11. A heat exchanger comprising a plurality of tube-in-shell heat exchangers assembled in cross-flow configuration, each tube-in-shell heat exchanger comprising:
a first tube sheet;
a second tube sheet;
a tube extending from the first tube sheet to the second tube sheet the tube sheets and the tube being formed of woven ceramic fibers,
said woven tube having longitudinally oriented warp fibers extending from each tube sheet to the tube forming a continuous transition from the first tube sheet to the tube and from the second tube sheet to the tube.

12. The heat exchanger of claim 11 wherein the ceramic fibers are formed of a material selected from the group consisting of silicon carbide, alumina, and zirconium oxide.

13. The heat exchanger of claim 12 wherein the ceramic fibers are coated with a ceramic matrix material after weaving.

* * * * *